(12) United States Patent  
Hobrecht

(10) Patent No.: US 7,354,089 B2
(45) Date of Patent: Apr. 8, 2008

(54) TONNEAU COVER

(75) Inventor: Dave Hobrecht, Newport Beach, CA (US)

(73) Assignee: DropTop, LLC, Los Angeles, CA (US)

( * ) Notice: Subject to any disclaimer, the term of this patent is extended or adjusted under 35 U.S.C. 154(b) by 0 days.

(21) Appl. No.: 11/580,455

(22) Filed: Oct. 13, 2006

(65) Prior Publication Data

US 2007/0257507 A1 Nov. 8, 2007

Related U.S. Application Data

(60) Provisional application No. 60/746,676, filed on May 8, 2006.

(51) Int. Cl.
B62D 33/02 (2006.01)
(52) U.S. Cl. .............................. 296/26.07; 296/183.1; 296/37.6; 296/39.2
(58) Field of Classification Search ............ 296/26.07, 296/183.01, 183.2, 37.6, 100.02, 100.06, 296/100.07, 100.08, 100.1, 39.2; 224/403, 224/404
See application file for complete search history.

(56) References Cited

U.S. PATENT DOCUMENTS

| 4,394,100 A | * | 7/1983 | Sperlich ........................ 410/2 |
| 4,733,898 A | | 3/1988 | Williams |
| 5,118,156 A | * | 6/1992 | Richard ........................ 296/40 |
| 5,303,969 A | | 4/1994 | Simnacher |
| 5,322,336 A | | 6/1994 | Isler |
| 5,494,315 A | | 2/1996 | Heltenburg |
| 5,568,890 A | | 10/1996 | Magee et al. |
| 5,848,818 A | | 12/1998 | Flueckinger |
| 5,988,722 A | * | 11/1999 | Parri ........................ 296/26.09 |
| 5,996,868 A | | 12/1999 | Paradis |
| D419,951 S | | 2/2000 | Emery et al. |
| 6,209,944 B1 | | 4/2001 | Billiu et al. |
| 6,234,559 B1 | | 5/2001 | Block et al. |
| 6,302,464 B1 | | 10/2001 | Kubis et al. |
| 6,321,819 B1 | * | 11/2001 | Copp et al. .................... 160/35 |
| 6,467,830 B1 | | 10/2002 | Cortright |
| 6,533,344 B1 | | 3/2003 | Patterson |
| 6,641,013 B2 | | 11/2003 | Dise |
| 6,666,490 B1 | * | 12/2003 | Thacker ................... 296/26.07 |
| 6,702,359 B2 | * | 3/2004 | Armstrong et al. .... 296/100.02 |
| 6,712,418 B1 | * | 3/2004 | Lathers ................... 296/100.02 |
| 6,789,829 B1 | * | 9/2004 | Kapels ........................ 296/11 |
| 6,886,876 B1 | | 5/2005 | Damian |
| 6,896,313 B2 | | 5/2005 | Mack et al. |
| 6,902,222 B2 | * | 6/2005 | Nykiel et al. .......... 296/100.02 |
| 6,921,120 B1 | * | 7/2005 | Ervin ...................... 296/26.02 |
| 7,104,582 B2 | * | 9/2006 | Morrison ................... 296/37.5 |
| 2002/0005651 A1 | * | 1/2002 | Young et al. ............ 296/100.1 |
| 2006/0175863 A1 | * | 8/2006 | Evans ................... 296/100.08 |

* cited by examiner

Primary Examiner—Jason S Morrow
(74) Attorney, Agent, or Firm—Walter A. Hackler

(57) ABSTRACT

A tonneau cover assembly for a truck having a bed and a pair of upstanding sidewalls generally includes a panel having a perimeter conforming to a perimeter of the bed and a mechanism for enabling movement of the panel between the first position abutting the bed and a second position generally level with tops of the upstanding sidewalls.

15 Claims, 3 Drawing Sheets

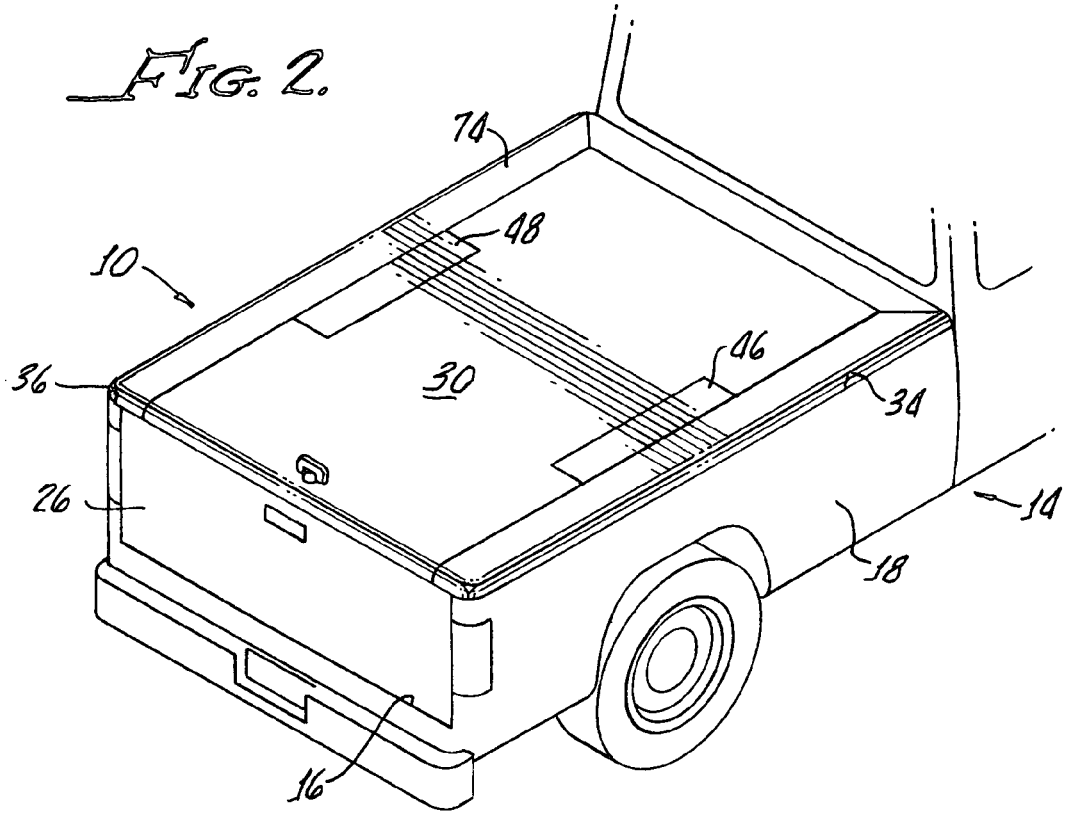
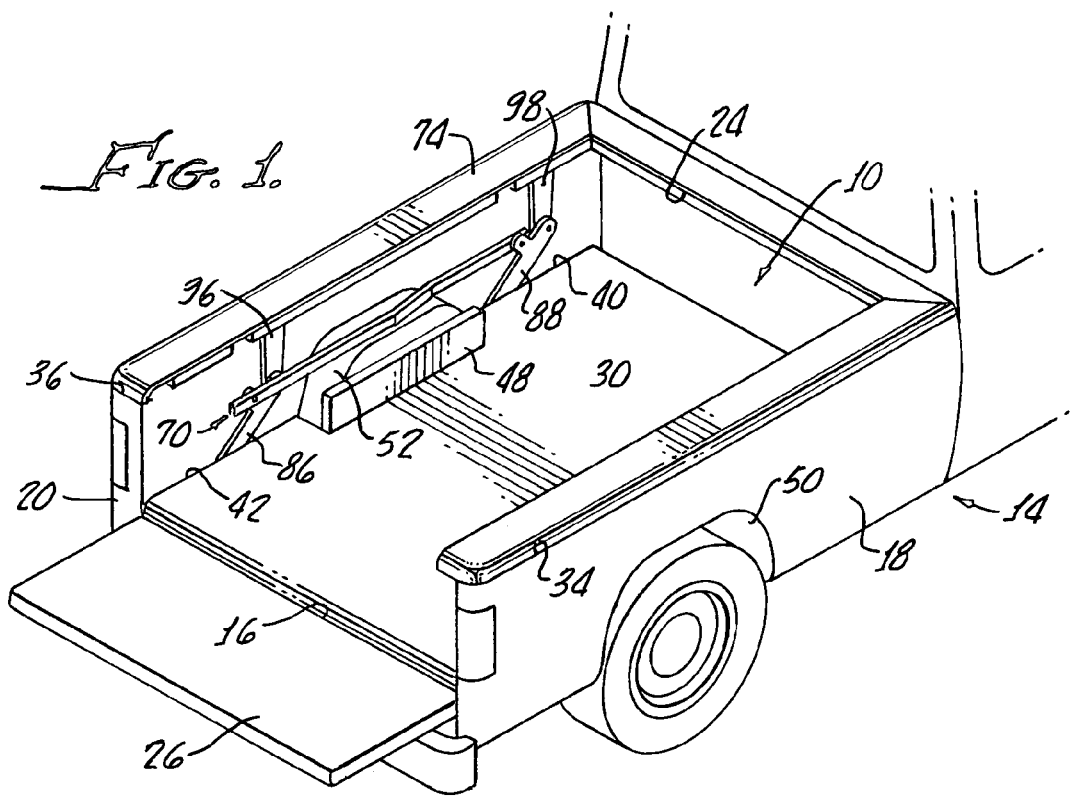

TONNEAU COVER

The present application claims priority from U.S. Provisional patent application Ser. No. 60/746,676 filed May 8, 2006. This application is to be incorporated herewith in its entirety by this specific reference thereto.

The present invention generally relates to coverings for truck beds and is more particularly directed to a tonneau cover enabling full use of a truck bed.

Any number of covers have been developed for pickup trucks. Fabric covers secured to truck sidewalls above the bed enable full use of the bed when removed. However, it provides no protection against unauthorized entry.

Accordingly, a great number of rigid covers have been developed any member of which include folding and sliding panels. Other rigid covers may be hinged at a forward end, or front wall of a pickup truck, which provides for easy access to transported items. However, the problem with these tops lies in the fact that the truck bed cannot be used as a truck bed for carrying large loads which would extend above the truck bed level. These tops must be physically removed and stored while the truck is used conventionally for carrying large loads.

Other folding and sliding tops provide access to only a part of the bed space and thus limit the carrying capacity of the truck when in a folded or rolled position.

The present invention provides the benefits of the protection of a tonneau cover while at the same time enabling full use of the truck bed without having to disassemble and store the tonneau cover.

SUMMARY OF THE INVENTION

A tonneau cover assembly in accordance with the present invention for a truck having a bed and a pair of upstanding sidewalls extending between a front wall and a tailgate generally includes a panel and a mechanism for enabling movement of the panel between a first position abutting the bed and a second position level with tops of the upstanding sidewalls. In this manner, when the panel is abutting the bed the truck may be used in a conventional manner for carrying loads that may extend above the truck bed level. Movement of the panel to the second position level with tops of the upstanding sidewalls enables function as a conventional rigid tonneau cover.

Preferably, the panel has a perimeter conforming to a perimeter of the bed and when utilized with a truck bed including opposing wheel well covers, the panel may include a pair of hinged flaps for accommodating movement of the panel to the first position abutting the bed with the flaps being moved to an upstanding position as the panel approaches the first position abutting the bed.

In the second position, the flaps cover tops of the wheel well covers.

More particularly, the assembly includes a top frame which is sized and configured for resting sidewall and tops and hinged at the front wall for enabling pivotal movement at the front wall. The mechanism depends from the top frame and accordingly the entire panel and mechanism is pivotally moveable to an open position similar to a conventional openable rigid tonneau covers.

Still more particularly, the mechanism includes articulating arms for enabling generally vertical movement of the panel. This feature enables movement of the panel between the first position abutting the bed and the second position in a plane with the sidewall tops without hindrance by the stationary wheel well covers.

The articulating arms are pivotally attached to depending brackets fixed to the top frame and said panel. Connecting arms disposed between and pivotally attached between pairs of articulated arms may be provided for facilitating movement of the panel.

BRIEF DESCRIPTION OF THE DRAWINGS

The advantages and features of the present invention will be better understood by the following description when considered in conjunction with the accompanying drawings in which:

FIG. 1 is a perspective view of a tonneau cover assembly in accordance with the present invention showing a panel disposed in a first abutting position with a bed of a truck, thereby enabling full use of the cargo area, along with a mechanism for enabling movement of the panel between the first abutting position and a second position level with tops of upstanding sidewalls;

FIG. 2 illustrates the panel after movement by the mechanism to the second position level with tops of the truck sidewalls;

DETAILED DESCRIPTION

Figure 3:
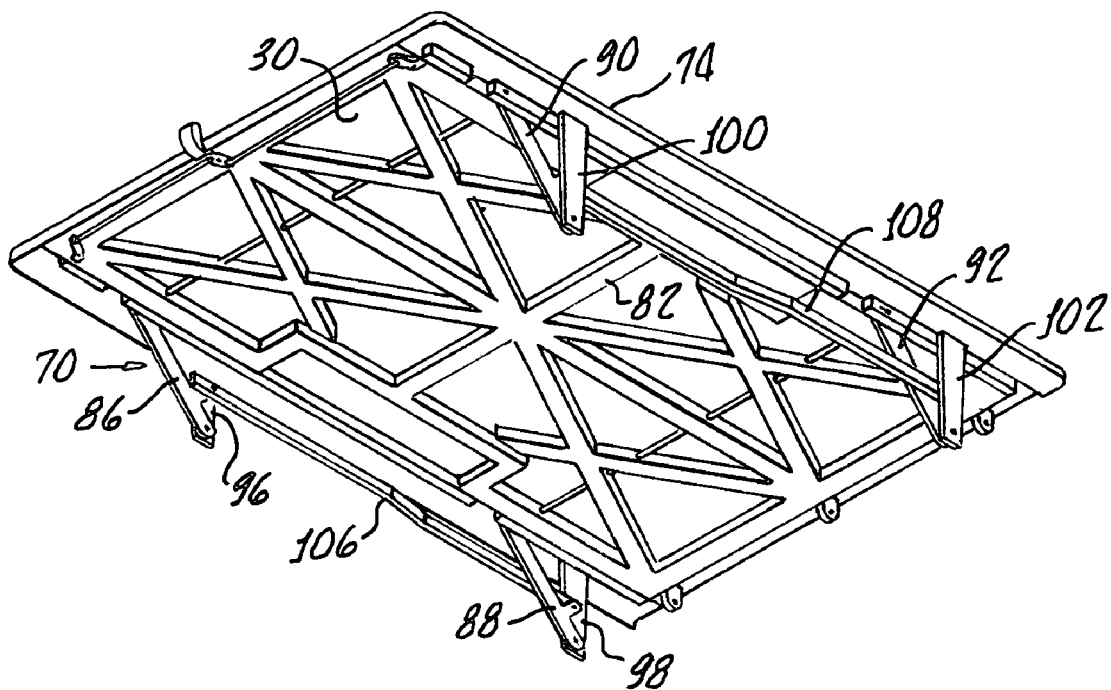
FIG. 3 is a perspective view of a bottom of the panel further illustrating the mechanism for enabling movement of the panel along with a top frame sized for resting atop the sidewall tops, articulating arms and brackets supporting the arms depending from the top frame.

With reference to FIGS. 1 and 2, there is shown a tonneau cover assembly 10 suitable for installation on the truck 14, the truck including a bed 16 and upstanding sidewalls 18, 20 extending between a front wall 24 and a tailgate 26.

The tonneau cover assembly 10 generally includes a panel 30 which is, as hereinafter described, moveable between a first position abutting the truck bed 16, as illustrated in FIG. 1, and a second position generally level with tops, as illustrated in FIG. 2.

Preferably, the panel 30 includes a perimeter 40 which conforms to a bed perimeter 42. However, it should be appreciated that the panel may be of any configuration or shape abuttable with the truck bed 16 for enabling use of the truck for carrying loads (not shown) on top of the panel in the manner of a conventional pickup truck without the panel.

However, with the conforming perimeter 40 when the panel 30 is raised to the second position, as shown in FIG. 2, complete elevated coverage of the truck bed 16 is provided.

Hinged flaps 46, 48 enable passage of the panel past wheel well covers 50, 52 which may include locks (not shown) for preventing access when the panel 30 is in the second position as illustrated in FIG. 2.

A mechanism 70 enables movement of the panel 30 between the first position abutting the bed as shown in FIG. 1 and the second position generally level with tops 34, 36 of the upstanding sidewalls 18, 20 as shown in FIG. 2.

Figure 7:
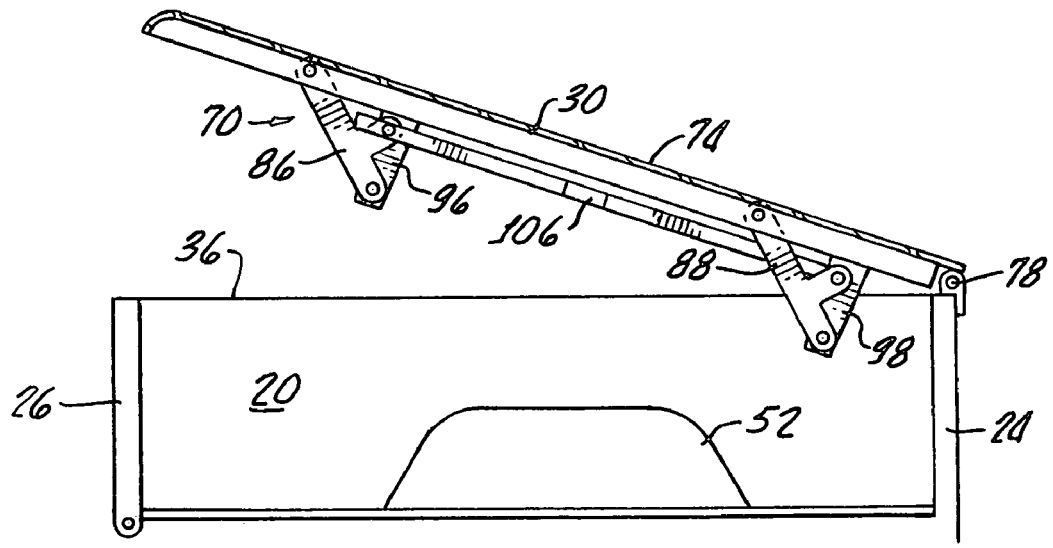
FIG. 7 illustrates the panel and top frame in an open position exposing the truck bed through the use of a hinge disposed at the truck bed front wall.

A top frame 74 sized for resting a top the sidewall on tops 34, 36 and front wall 24 supports the mechanism 70 and is hinged 78 at the front wall 24 for enabling the pivotal movement at the front wall 24, as illustrated in FIG. 7. The mechanism 70 depends from the top frame 74 and is removable therewith.

Bracing 82, see FIG. 3, provides for integrity, stability, and strength for the panel 30 in a conventional manner.

Figure 4:
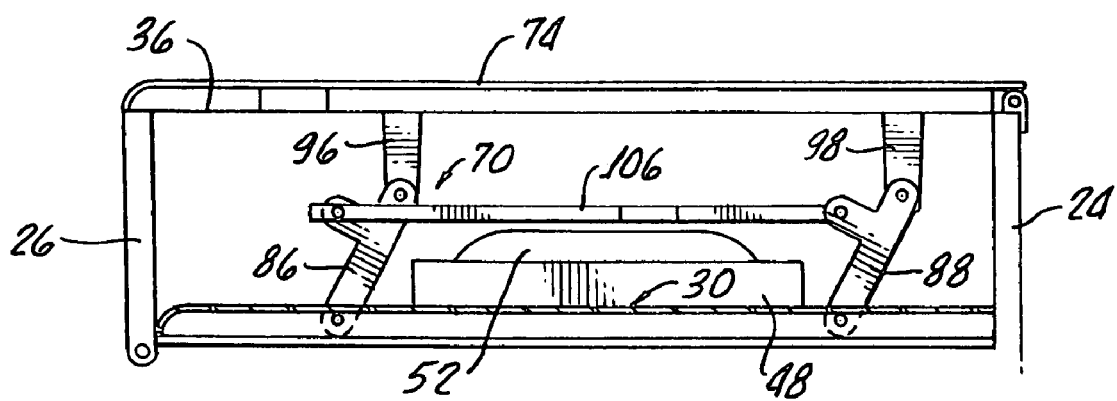
FIG. 4 is a cross sectional view illustrating the panel in an abutting relationship with a truck bed along with articulating arms interconnected with the top frame depending brackets and connecting arms disposed between and pivotally attached between pairs of articulating arms.
Figure 5:
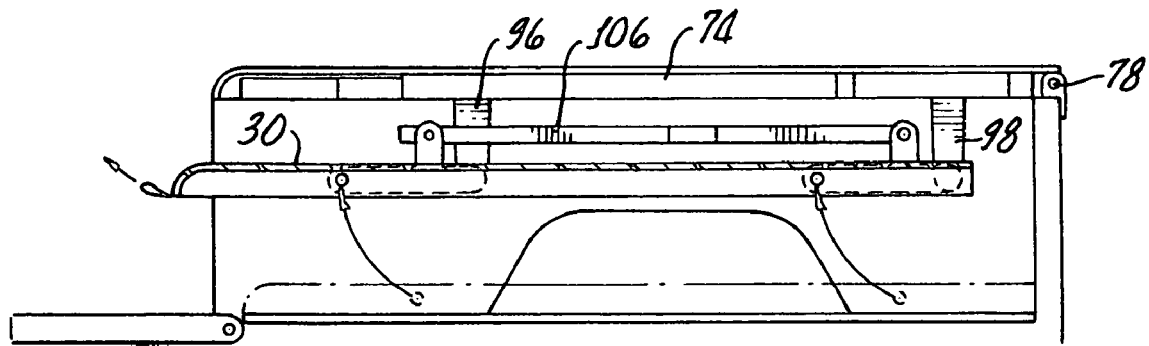
FIG. 5 is a cross sectional view similar to that shown in FIG. 4 illustrating the panel in a midway position.
Figure 6:
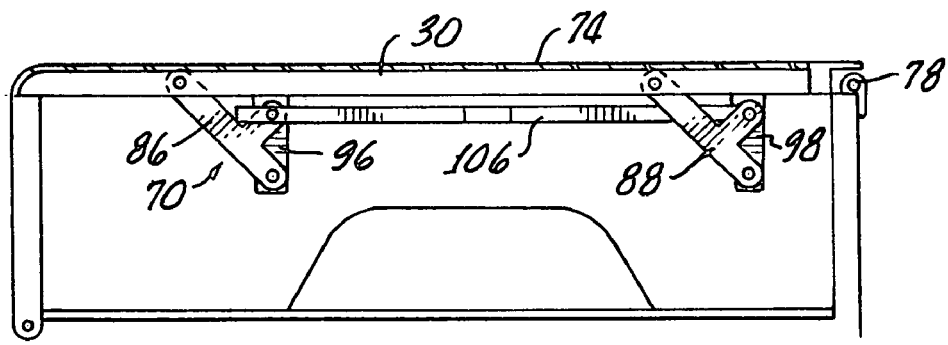
FIG. 6 is a figure similar to that shown in FIGS. 4 and 5 illustrating the top being raised to the second position parallel to sidewall tops.

The mechanism 70 may include articulating arms 86, 88, two opposing sets being provided (but only one shown for the sake of describing the mechanism 70 in FIGS. 4-7) which enable generally vertical movement from the first position, illustrated in FIG. 4, to the second position, as illustrated in FIG. 6. This enables the panel perimeter 42 clear the wheel well covers 50, 52.

The articulating arms 86, 88, 90, 92 are attached to depending brackets 96, 98, 100, 102 respectively as best seen in FIG. 3. Connecting rods 106, 108 are disposed between and pivotally attached to arm pairs 86, 88 and 90, 92 respectively for coordinating movement of the panel from the first to the second position.

When in the second position, a key lock (not shown) of any suitable type may be provided for locking the panel 30 and top frame 72 to the tailgate 26.

Although there has been hereinabove described a specific tonneau cover in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A tonneau cover assembly for a truck having a bed and a pair of upstanding sidewalls extending between a front wall and a tailgate, and a pair of opposing wheel well covers, each extending upwardly from said bed, said tonneau cover assembly comprising:
   a panel having a perimeter conforming to a perimeter of said bed and abuttable therewith in a parallel relationship, said panel comprising a pair of hinged flaps accommodating movement of said panel to a first position abutting said bed, said flaps being moved to an upstanding position as the panel approaches the first position; and
   a mechanism for enabling movement of said panel between the first position and a second position generally level with tops of said upstanding sidewalls.

2. The assembly according to claim 1 further comprising a top frame sized for resting atop the sidewall tops and hinged at the front wall for enabling pivotal movement at the front wall and said mechanism depends from said top frame.

3. The assembly according to claim 1 wherein said mechanism comprises articulating arms for enabling generally vertical movement of said panel.

4. The assembly according to claim 3 wherein said articulating arms are pivotally attached to depending brackets fixed to said top frame and said panel.

5. The assembly according to claim 4 further comprising connecting rods disposed between and pivotally attached between pairs of articulating arms.

6. A tonneau cover assembly for a truck having a bed and a pair of upstanding sidewalls extending between a front wall and a tailgate, and a pair of opposing wheel well covers, each extending upwardly from said bed said tonneau cover assembly comprising:
   a flat panel disposed in a parallel relationship with said bed panel comprising a pair of hinged flaps accommodating movement of said panel to a first position abutting said bed, said flaps being moved to an upstanding position as the panel approaches the first position; and
   a mechanism for enabling movement of said panel between the first position, and a second position generally level with tops of said upstanding sidewall.

7. The assembly according to claim 6 further comprising a top frame sized for resting atop the sidewall tops and hinged at the front wall for enabling pivotal movement at the front wall and said mechanism depends from said top frame.

8. The assembly according to claim 7 wherein said mechanism comprises articulating arms for enabling generally vertical movement of said panel.

9. The assembly according to claim 8 wherein said articulating arms are pivotally attached to depending brackets fixed to said top frame and said panel.

10. The assembly according to claim 9 further comprising connecting rods disposed between and pivotally attached between pairs of articulated arms.

11. A tonneau cover assembly for a truck having a bed and a pair of upstanding sidewalls extending between a front wall and a tailgate, along with a pair of opposing wheel well covers, each extending upwardly from said bed, said tonneau cover assembly comprising:
   a panel;
   a mechanism for enabling movement of said panel between a first position abutting said bed, and a second position generally level with tops of said upstanding sidewall; and
   a pair of flaps hinged to said panel for accommodating movement of said panel to the first position, said flaps being moved to an upstanding position as the panel approaches the first position.

12. The assembly according to claim 6 further comprising a top frame sized for resting atop the sidewall tops and hinged at the front wall for enabling pivotal movement at the front wall and said mechanism depends from said top frame.

13. The assembly according to claim 7 wherein said mechanism comprises articulating arms for enabling generally vertical movement of said panel.

14. The assembly according to claim 8 wherein said articulating arms are pivotally attached to depending brackets fixed to said top frame and said panel.

15. The assembly according to claim 9 further comprising connecting rods disposed between and pivotally attached between pairs of articulated arms.

* * * * *